United States Patent
Cheng

[11] Patent Number: 6,014,254
[45] Date of Patent: Jan. 11, 2000

[54] OPTICAL DEVICE FOR SPLITTING AN INPUT BEAM INTO TWO ORTHOGONAL POLARIZATION STATES

[76] Inventor: Yihao Cheng, 36 Meadowbreeze Dr., Kanata, Ontario, Canada, K2M 2L6

[21] Appl. No.: 08/803,827

[22] Filed: Feb. 24, 1997

[51] Int. Cl.[7] .............................. G02B 5/30; G02B 6/32; G02B 6/34

[52] U.S. Cl. ........................ 359/484; 359/495; 359/497; 359/282; 385/27; 385/34; 385/36; 385/38

[58] Field of Search ..................... 359/494, 495, 359/496, 497, 484, 281, 282; 372/703; 385/11, 27, 28, 31, 33, 34, 35, 36, 38, 123

[56] References Cited

U.S. PATENT DOCUMENTS

| | | | |
|---|---|---|---|
| 4,178,073 | 12/1979 | Uchida et al. | 359/484 |
| 4,239,329 | 12/1980 | Matsumoto . | |
| 4,375,910 | 3/1983 | Seki . | |
| 5,033,830 | 7/1991 | Jameson | 359/484 |
| 5,293,438 | 3/1994 | Konno et al. | 385/35 |
| 5,384,874 | 1/1995 | Hirai et al. | 385/34 |
| 5,574,595 | 11/1996 | Kurata et al. | 359/484 |
| 5,588,078 | 12/1996 | Cheng et al. | 372/703 |
| 5,734,763 | 3/1998 | Chang | 385/11 |
| 5,757,993 | 5/1998 | Abe | 385/34 |
| 5,825,950 | 10/1998 | Cheng | 385/27 |
| 5,848,203 | 12/1998 | Kawakami et al. | 385/11 |

FOREIGN PATENT DOCUMENTS

| | | |
|---|---|---|
| 040619 | of 0000 | Japan . |
| 55-138702 | 10/1980 | Japan . |
| 58-82220 | 5/1983 | Japan . |
| 62-200320 | 9/1987 | Japan . |
| 4-311917 | 11/1992 | Japan . |
| 8-234046 | 9/1996 | Japan . |

*Primary Examiner*—Ricky D. Shafer
*Attorney, Agent, or Firm*—Neil Teitelbaum & Associates

[57] ABSTRACT

An optical fiber having a small numerical aperture (NA) is optically coupled with a short birefringent crystal to provide a polarization beam splitter. This arrangement obviates the use of a GRIN lens coupled between an input optical fiber and the birefringent crystal and provides significant cost savings by allowing a short crystal to be used. In this invention, the birefringent crystal has a beam-shifting angle that is larger than the numerical aperture at the output end of the optical fiber.

12 Claims, 6 Drawing Sheets

OPTICAL DEVICE FOR SPLITTING AN INPUT BEAM INTO TWO ORTHOGONAL POLARIZATION STATES

FIELD OF THE INVENTION

This invention relates to an optical device for splitting an input beam of light into two orthogonally polarized light beams.

BACKGROUND OF THE INVENTION

Conventional polarization beam splitters are used in a vast number of optics applications. These devices perform the function of separating s-polarized light and p-polarized light. Polarizing beam-splitters are essentially commonplace optical components and are currently widely used in optical instruments, lasers, electro-optic displays, optical recording and in the fabrication of other optical components. There are several parameters that can be used to describe the performance of a polarizing beam-splitter. These parameters are: the wavelength range over which the polarizing beam-splitter is effective, the angular field of the incident light in which the polarizer or polarizing beam-splitter is effective and the extinction ratio of the desired polarized light to the unwanted polarized light after the light passes through polarizing beam-splitter.

Commonly available polarizing beam-splitters can be divided into several types that depend upon different physical principles: pile-of-plates polarizers, reflection polarizers, Polaroid sheet polarizers, polarizers based on birefringent crystals, metallic grid polarizers, and thin film interference polarizers.

The instant invention is concerned with polarizing beam splitters (PBSs) based on birefringent crystals that perform well over a broad band of wavelengths and a wide range of angles. Normally these PBSs are comprised of a birefringent crystal prism. The optical axes of the prism are such that a lower refractive index exists along one axis for the ordinary light (polarized in one direction) and a higher refractive index exists along another axis for the extraordinary light (polarized in the other direction), or vice versa. Therefore, a very high extinction ratio is achieved. Many different arrangements for such PBSs exist. However this type of PBS is has generally been relatively costly; furthermore, they cannot be made in large sizes because of the limited availability of birefringent crystal materials.

Conventional PBSs using a single birefringent crystal have required provision of a collimated beam at the input end face of the crystal, therefore a lens has been provided before the crystal to provide the collimated beam. This design is seen to be a disadvantage.

It is therefore an object of this invention to overcome some of the disadvantages of conventional PBS designs, using a birefringent crystal.

It is a further object of this invention to provide a PBS that only requires a relatively small birefringent crystal.

SUMMARY OF THE INVENTION

In accordance with this invention, a PBS is provided wherein a birefringent crystal having a short length, suffices to separate an incoming beam into two beams, one of s-polarized light and the other beam of p-polarized light. The birefringent crystal is optically coupled with an optical fibre that has a small numerical aperture and/or a small acceptance angle, smaller than the angle of separation provided by the birefringent crystal for a given wavelength of input light.

In accordance with the invention there is provided, an optical device for separating polarization states of incoming light comprising:
an optical fibre having an input end, and an output end having a predetermined numerical aperture/and or acceptance angle; and a birefringent crystal, having an end face optically coupled with the output end of the optical fibre, said birefringent crystal having a beam shifting angle larger than the numerical aperture/and or acceptance angle at the output end of the optical fibre.

In accordance with the invention, there is provided, an optical device for separating polarization states of incoming light comprising:
at least 3 units each including:
an optical fibre having an input end, and an output end having a predetermined numerical aperture and/or acceptance angle; and
a birefringent crystal, having an end face optically coupled with the output end of the optical fibre, said birefringent crystal having a beam shifting angle that is larger than the numerical aperture and/or acceptance angle at the output end of the optical fibre;
reciprocal and non-reciprocal rotating means, juxtaposed between an end face of the birefringent crystal and a graded index lens; and,
a polarization beam splitter located between the three units disposed in such a manner as to allow light from one of the graded index lenses to pass through or reflect from the polarization beam splitter to another of the graded index lenses.

BRIEF DESCRIPTION OF THE DRAWINGS

Exemplary embodiments of the invention will now be described in conjunction with the drawings, in which.

DETAILED DESCRIPTION

Figure 1:
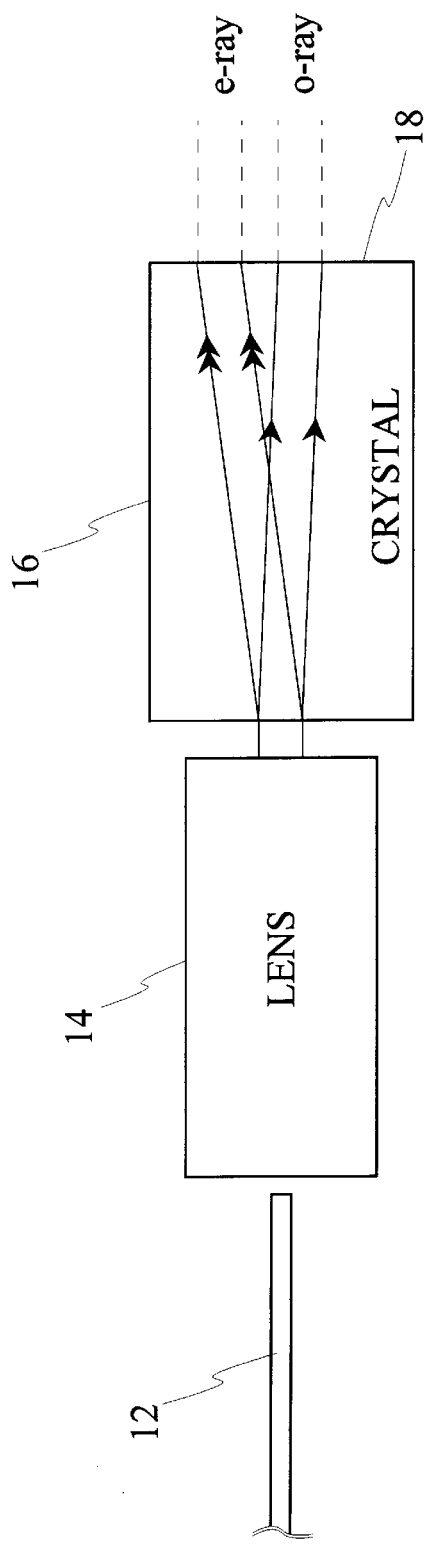
FIG. 1 is a side view of a conventional prior art arrangement of a polarization beam splitter using standard optical components.

Referring now to FIG. 1, a prior art arrangement of optical elements is shown for splitting an incoming beam of light of unknown polarization state(s) into two beams or rays termed "e-ray" and "o-ray". Of course, these rays are plural rays comprising two substantially collimated orthogonally polarized beams. A standard communications optical fibre 12 having a core of approximately 10 µm is coupled with a quarter pitch collimating graded index (GRIN) lens 14 for collimating an input beam launched into an input end of the optical fibre 12. Adjacent the collimating end of the lens 14 is a birefringent element 16 in the form of a crystal having and end face coupled therewith. As the single beam of light of unknown polarization state(s) enters the birefringent crystal at its input end face, the beam is split into two orthogonally polarized beams of o-rays and e-rays. However, in order for the device to be useful as a PBS, the beams must not only travel along different paths, but must be spatially separated in order to capture p-polarized light and s-polarized light separately at two locations. For example, in FIG. 1 a birefringent crystal is shown coupled to a GRIN lens 14. The output beam of the GRIN lens provided to the input end face of the birefringent crystal 16 has a diameter of approximately 350 µm. Normally the splitting ratio is approximately 10 to1. Thus, in order to separate the beams at the output end of the crystal 16, its length must be approximately 3.5 mm, (10:1) given an input beam diameter of 350 µm. Notwithstanding, the splitting angle of the crystal is also dependent upon a refractive index difference within the crystal.

Figure 1B:
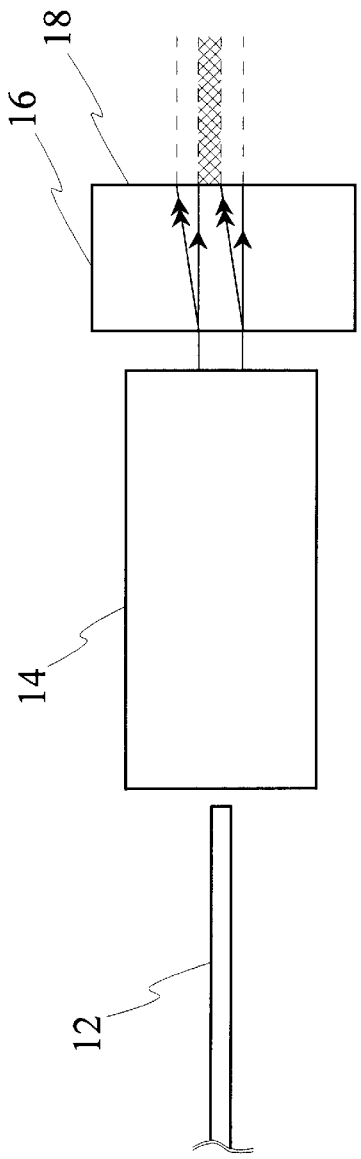

In the arrangement of FIG. 1, the length of the crystal and shifting angle are sufficient to ensure that the beams at the output end 18 arc completely separated. In contrast, the crystal 16 in FIG. 1b having the same shifting angle is too short, given the substantial width of the incoming beam to separate the two orthogonally polarized beams of light, and there is a region of overlap (indicated by cross hatching) at the output end face 18. Since the beams exiting the end face of the birefringent crystal exit along path that is parallel to the input beam received from GRIN lens 14, capturing two separate orthogonally polarized beams from the output end face of the crystal 16 in the arrangement of FIG. 1b, is not possible due to overlapping of the beams. Thus a sufficiently long birefringent crystal is required to obtain complete separation. Large birefringent crystals are relatively costly.

Numerical aperture (NA) of an optical fibre is inversely proportional to the square root of the core diameter of an optical fibre. A consequence of a larger NA is a larger angular divergence of an output beam exiting. One way of providing an optical fibre that has a small NA or acceptance angle is to expand the core of the fibre by heating. A conventional beam expanding fiber is disclosed in a reference entitled "Beam Expanding Fiber Using Thermal Diffusion of the Dopant" in Journal of Lightwave Technology. Vol. 8, No. 8 August 1990. The beam expanding fiber of the above reference has a core whose index of refraction is determined by the dopant e.g., Ge, that is thermally diffused so that a spot size of the fundamental mode, which corresponds to "mode-field diameter of the optical fiber", is partially expanded.

Producing an optical fibre having an small NA can also be achieved by doping the fibre such that the cladding and the core have a small difference in refractive index.

Figure 2:
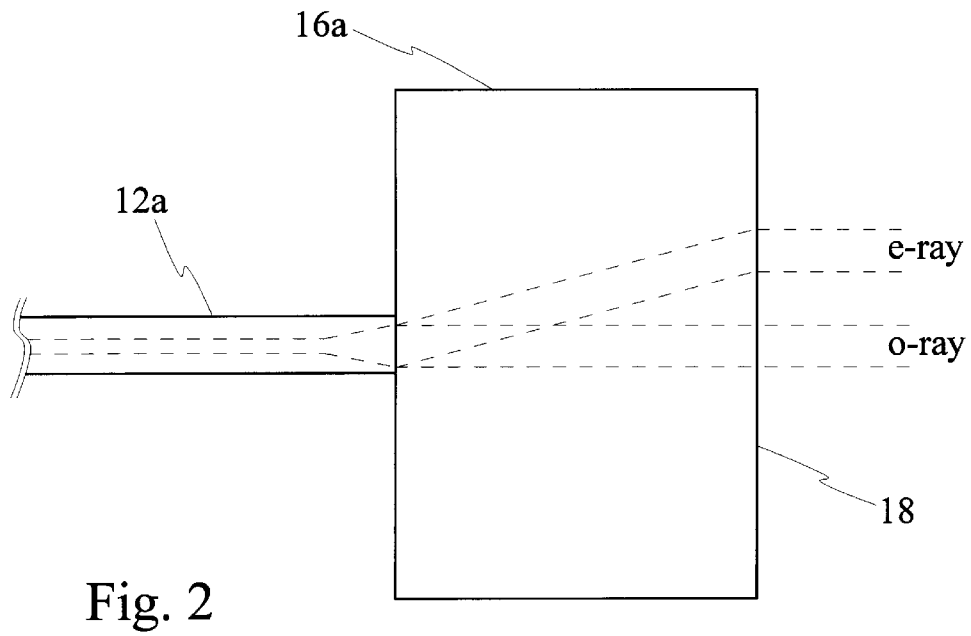
FIG. 2 is a side view of a polarization beam splitter having a substantially shorter birefringent crystal than that shown in FIG. 1.

FIG. 2 shows an embodiment of the invention wherein a short birefringent crystal 16a can be used and adequate separation of two polarized output beams is realized. An input fibre 12a having a small numerical aperture (NA) of 0.03 and a core diameter of 35 µm is optically coupled with a short birefringent crystal 16a of thickness of a little more than 500 µm from input end face to output end face. The output end face of the optical fibre 12a has an expanded mode field, and thus a small NA. The output response of this embodiment is shown in the graph in FIG. 3, where a dotted line indicates the diameter of a beam that originated within the input fibre as it passes through the short rutile crystal 16a as function of the crystal thickness. The solid line in the graph indicates the change in beam separation as a function of thickness of the crystal. For points along the graph to the right of the crossover point where the dotted and solid lines intersect, adequate separation results.

Figure 4:
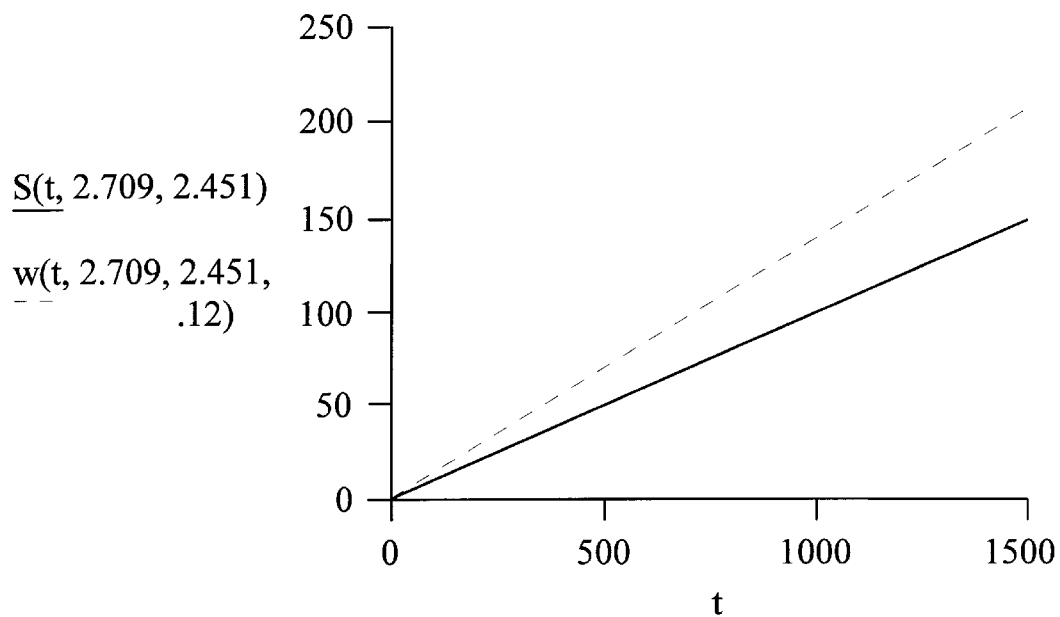
FIG. 4 is a graph depicting an output response for a rutile crystal coupled with an industry standard optical fibre, showing a dotted line indicating the diameter of a beam as it passes through the short rutile crystal as function of the thickness of the crystal, and a solid line indicating the change in beam separation as a function of thickness of the crystal.

In contrast, FIG. 4 shows a graph of beam diameter and beam separation versus thickness of a rutile crystal for a standard communications optical fibre having an NA of 0.1 similarly optically coupled with a rutile crystal. Since the slope of the dotted line in the graph is greater than the slope of the solid line, separation of the two orthogonally polarized beams is not achievable. Thus, independent of the thickness of the rutile birefringent crystal, the beams of light propagating thought the crystal overlap one another.

Figure 3:
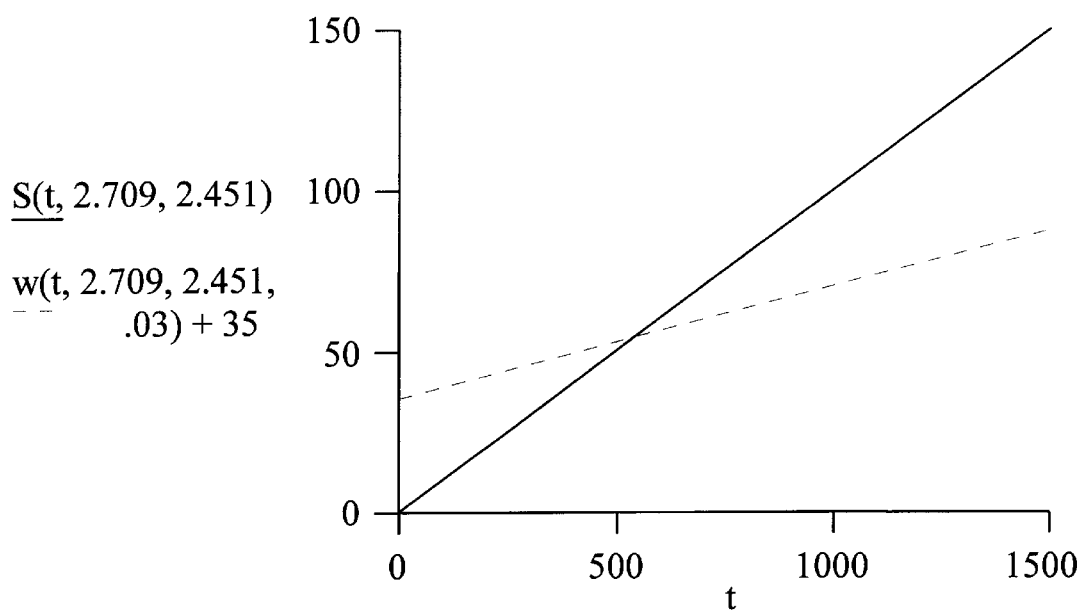
FIG. 3 is a graph depicting an output response for a rutile crystal coupled with a thermally expanded core (TEC) optical fibre in accordance with the invention, showing a dotted line indicating the diameter of a beam as it passes through the short rutile crystal as function of the thickness of the crystal, and a solid line indicating the change in beam separation as a function of thickness of the crystal.
Figure 5:
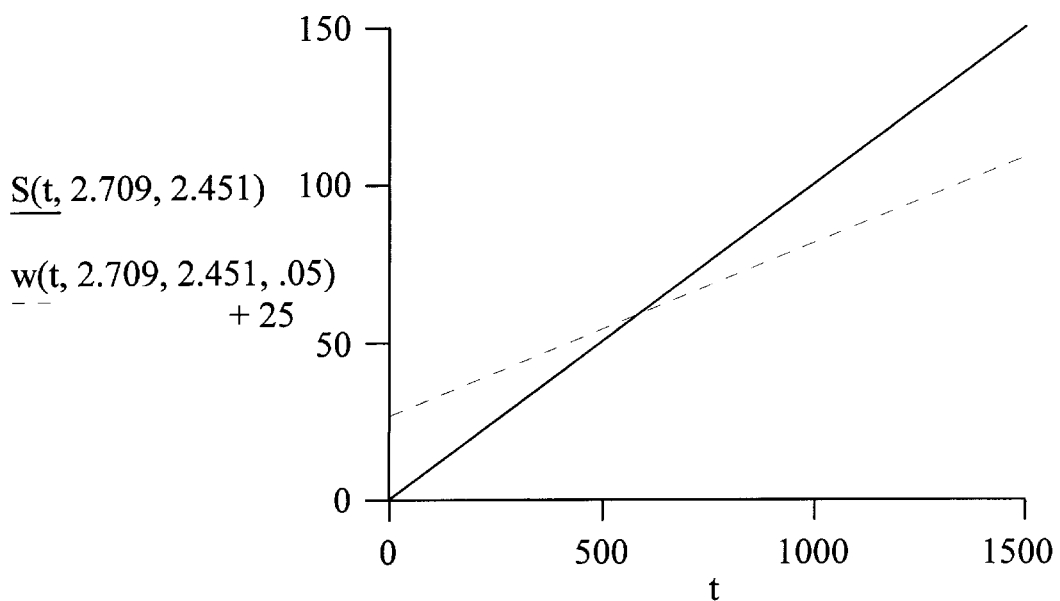
FIG. 5 is a similar graph to FIG. 3, wherein a TEC fibre is used having a core radius=25 µm and an NA=0.05.

FIG. 5, shows a graph of beam diameter and beam separation versus thickness of a rutile crystal for an embodiment of the invention wherein an optical fibre having a thermally expanded core has its end having an expanded mode field directly optically coupled with the rutile crystal as is exemplified by FIG. 3. The output response is similar to that of FIG. 3, however the NA of the fibre is 0.05 and the diameter of the core of the thermally expanded core (TEC) optical fibre is 25 µm.

Figure 6:
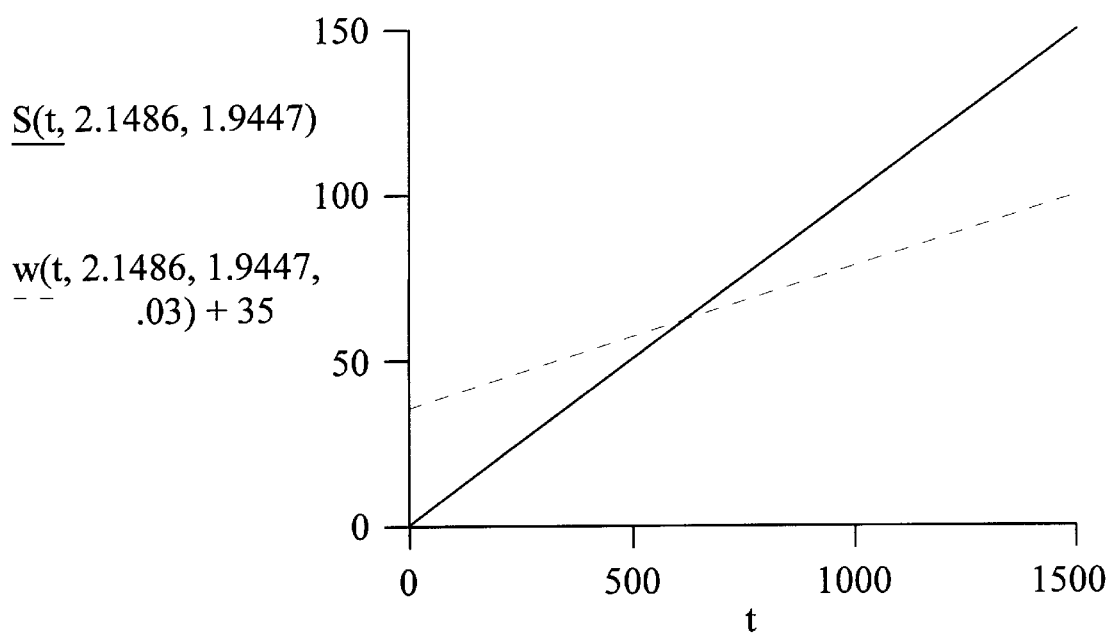
FIG. 6 is a similar graph to FIG. 3, wherein the output response is for a TEC fibre coupled with a YVO crystal, the fibre having an NA=0.03, and core diameter=35 µm in accordance with the invention.

FIG. 6 shows an output response for a TEC fibre (NA= 0.03, and core=35 µm). In this embodiment YVO crystal is used.

Figure 7:
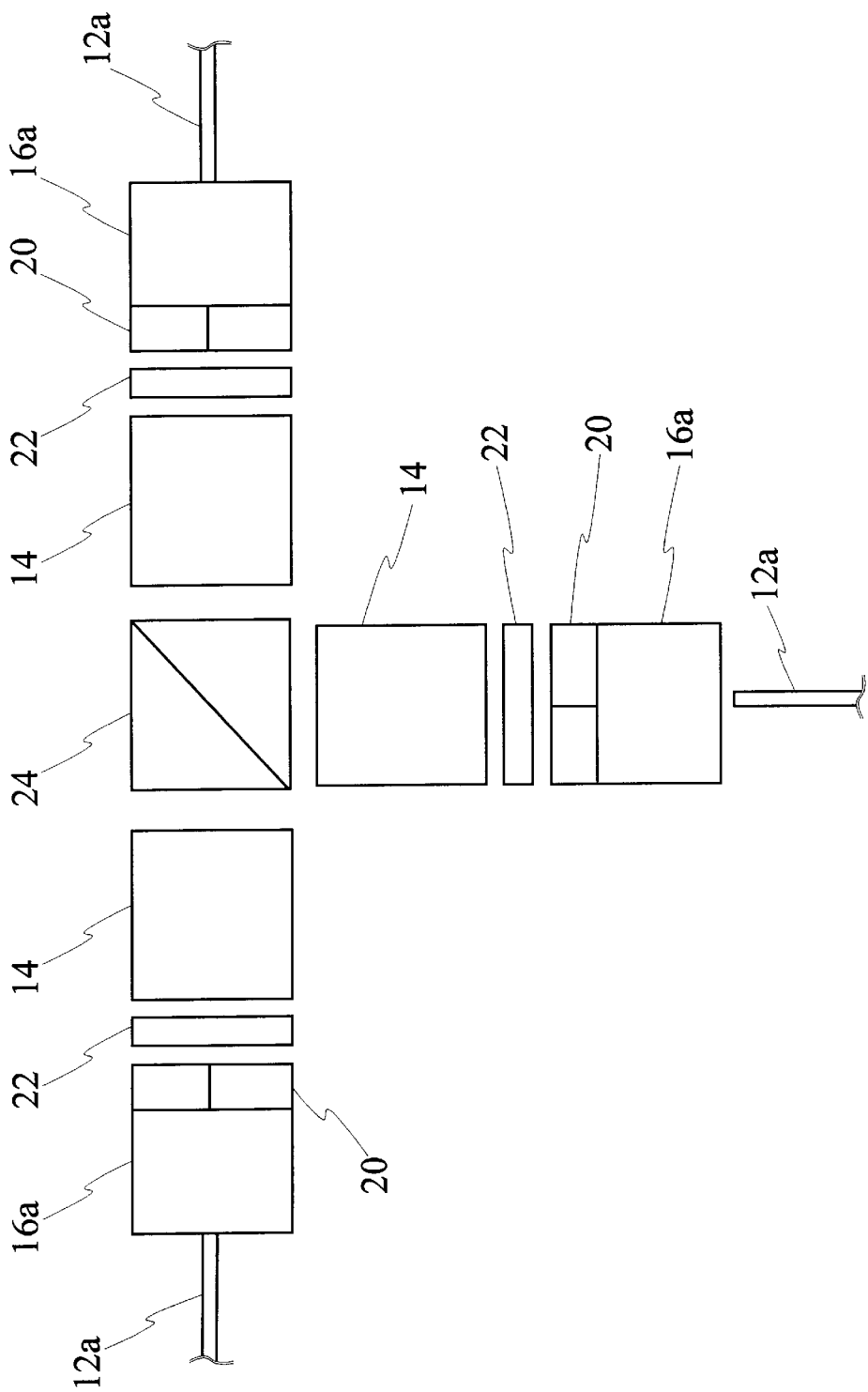
FIG. 7 is a block diagram of an optical circulator utilizing the structure shown in FIG. 2, in accordance with the invention; and, FIG. 8 is block diagram of a wavelength dependent demultiplexing device is shown in accordance with the invention.

The basic building block, shown and described heretofore comprises an optical fibre 12a having a small numerical aperture coupled with a birefringent crystal. Furthermore, this embodiment does not require a GRIN lens between the end face of the optical fibre and the crystal. By utilizing this lensless arrangement, a practicable device can be built using an extremely short birefringent crystal, thereby significantly reducing the cost. And, still further, this basic building block can be used in combination with other components to realize yet more complex optical devices. For example, turning now to FIG. 7, an optical circulator is shown having three identical units each comprising an optical fibre 12a having a small NA coupled with a birefringent element 16a. Further, each unit includes two half-wave plates 20 and a Faraday rotator 22 juxtaposed to a graded index lens 14. The GRIN lens 14 of each of the units is optically aligned with a polarization beam splitter (PBS) 24. The basic operation of this device should be well understood by those skilled in the art as a 3-port optical circulator. The cost savings of the circulator shown, over conventional circulators requiring larger birefringent crystals are significant.

Figure 8:
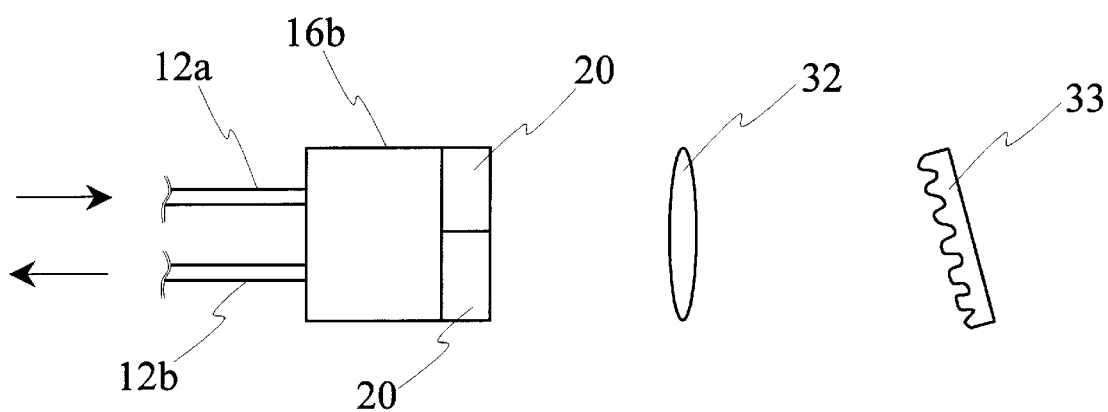

Other optical devices using the basic building block of a special optical fibre having a small NA coupled with a short birefringent crystal may be envisioned as well. By way of example, in FIG. 8, a wavelength dependent demultiplexing device is shown which operates in an essentially polarization independent manner by separating incoming light into two beams having a same predetermined polarization state and launching the two beams toward a reflective grating. In the device, a short crystal 16b is shown having an input optical fibre 12a and an output optical fibre 12b directly coupled to an end thereof. Both of the fibres have a small NA at their end face coupled to the crystal 16b. Two half wave-plates 20 are directly optically coupled to an end face of the crystal 16b. A lens 32 is spaced a predetermined distance from the wave-plates 20 for directing light to and from a grating 33 which has a reflectivity response dependent upon the wavelength of light incident upon it.

In operation light of an unknown polarization state(s) is launched into the input fibre 12a and is separated by the crystal 16b into two orthogonally polarized beams of light. After the beams pass through the half wave-plates 20 their polarization is rotated so that their polarization states are identical. So doing, and ensuring a correct polarization, essentially obviates polarization dependence of the device. Returning light from the diffraction grating of a predetermined wavelength then follows a path to the output optical fibre passing through the lens 32, the wave-plates 20 and the crystal 16b.

Numerous other embodiments of the invention may be envisaged without departing from the spirit and scope of the invention.

What I claim is:

1. An optical device for separating polarization states of incoming light into two separated orthogonally polarized beams of light comprising:

an optical fibre having an input end, and an output end having a predetermined acceptance angle; and a birefringent material, having an end face optically coupled with the output end of the optical fibre so as to receive uncollimated light from the fibre, said birefringent material having an opposite end and a beam-shifting angle larger than the acceptance angle at the output end of the optical fibre such that the input beam is divided into two substantially separated beams at the opposite end face of the birefringent material.

2. An optical device as defined in claim 1, wherein at least the output end of the optical fibre has an expanded mode field.

3. An optical device as defined in claim 1, wherein the output end of the optical fibre has a numerical aperture of substantially less than 0.1.

4. An optical device as defined in claim 3, wherein the output end of the optical fibre has a numerical aperture of less than 0.07.

5. An optical device as defined in claim 1, further comprising a half wave-plate optically coupled with the birefringent material.

6. An optical device as defined in claim 1, including polarization-rotating means coupled to the output face of the material for rotating the polarization of the two beams.

7. An optical device as defined in claim 6, wherein the polarization-rotating means are for rotating the polarization of the two beams to be the same.

8. An optical device as defined in claim 7 wherein the polarization-rotating means comprise two wave-plates.

9. An optical device as defined in claim 6 wherein the polarization-rotating means comprises a Faraday rotator.

10. An optical device for separating polarization states of incoming light comprising:

an optical fibre having an input end, and an output end having a numerical aperture less than 0.07; and a birefringent material, having an end face optically coupled with the output end of the optical fibre, said birefringent material having a beam shifting angle larger than the numerical aperture at the output end of the optical fibre and a length of less than 3 mm.

11. An optical device as defined in claim 10 further comprising GRIN lens disposed to receive light from an end face of the birefringent material.

12. An optical device as defined in claim 11 comprising a half wave-plate disposed between an end face of the GRIN lens and an end face of the birefringent material.

* * * * *